April 16, 1957

F. A. GAGE

2,789,160

WEARABLE HEARING AID WITH A COMMON CASING
FOR AMPLIFIER AND BATTERIES

Filed Oct. 29, 1953

INVENTOR.
FRANKLIN A. GAGE

BY

Greene, Pinelee & Durr
ATTORNEYS

2,789,160
Patented Apr. 16, 1957

United States Patent Office

2,789,160

WEARABLE HEARING AID WITH A COMMON CASING FOR AMPLIFIER AND BATTERIES

Franklin A. Gage, Crotona on Hudson, N. Y., assignor to Sonotone Corporation, Elmsford, N. Y., a corporation of New York Application October 29, 1953, Serial No. 389,021

27 Claims. (Cl. 179—107)

This invention relates to wearable hearing aids and more specifically to a casing and arrangements for mounting the components of the hearing aids within the casing.

Among the objects of the invention is an arrangement and combination of a casing structure for a wearable hearing aid with the amplifier and battery elements housed within the casing and the various elements arranged to enable their mounting and assembly in the small minute flat casing space, in a simple manner while assuring ready servicing of the amplifier and easy replacement of the batteries.

Most hard-of-hearing or deafened persons are very sensitive and seek to conceal their impairment. Accordingly, a practical hearing aid must be light, small and compact so that it may be worn comfortably and inconspicuously on the body of the user. In addition, it must be simple and fool-proof in operation and it should require little attention so as to free the user from mental and physical strain as well as annoyances to which he is subjected when the instrument has to be repaired or checked up.

To meet the foregoing requirements, it is essential that the hearing aid amplifier be not only compact and small, but that all elements of the amplifier unit shall be readily accessible for speedy repair and reconditioning, without introducing complications when one or another circuit element of the amplifier has to be removed or replaced. In addition, it is also essential that all parts of the hearing aid amplifier shall have a high degree of immunity to moisture and heat, and that it should not be deleteriously affected by humidity and heat when worn hidden under the clothing of the body of the user.

Furthermore, it is also very desirable that such electron tube amplifier hearing aid should have in addition to a power cut-off control switch and a volume control structure, additional control units for selectively reducing or cutting the low-frequency response in at least two stages, for selectively cutting the high-frequency response, and for reducing the maximum power output level to suit the individual requirement of different users.

The foregoing and other objects of the invention will be best understood from the following description of exemplifications thereof, reference being had to the accompanying drawings in which:

Fig. 1 is an elevational view of a hearing aid amplifier unit with the rear casing wall removed;

Fig. 1-A is a circuit diagram of one form of a hearing aid amplifier in connection with which the exemplification of the invention will be described;

Fig. 2 is a rear view of the amplifier chassis of Fig. 1, as removed from the casing, with the microphone removed from its position thereon;

Fig. 2-A is identical with Fig. 2, showing the microphone in its position;

Fig. 3 is a view of the amplifier unit similar to Fig. 1, with the rear casing wall in position and part of its battery wall section broken away;

Figs. 3-A and 3-B are top and bottom views of the amplifier unit of Fig. 3;

Fig. 4 is a side view of the amplifier unit of Fig. 4, with the battery wall section tilted open;

Fig. 5 is a view similar to Fig. 1 of the front casing wall only;

Fig. 6 is a side view of the casing wall of Fig. 1, seen from the right;

Fig. 6-A is a cross-section along lines 9-A, 9-A of Fig. 6;

Figs. 7 and 8 are top and bottom views of the front casing wall of Fig. 8;

Figs. 8-A and 8-B are cross sectional views along lines 8-A, 8-A and 8-B, 8-B of Fig. 8;

Fig. 10-A is a cross-sectional view along lines 10-A, 10-A of Fig. 9;

Fig. 10-B is a view similar to Fig. 10 of the locking arm of the amplifier casing wall of Figs. 9 and 10;

Fig. 10-C is a side view of the arm of Fig. 10-B;

Fig. 13 is a side view of the wall section of Fig. 12 as seen from the right;

Fig. 15 is a view similar to Fig. 1, of the amplifier chassis together with the circuit elements which are affixed thereto, before mounting thereon the other amplifier components;

Fig. 16 is a rear view of the amplifier chassis of Fig. 15;

Fig. 17 is a view similar to Fig. 1 of the battery positioning structure of the amplifier chassis;

Figs. 17-A and 17-B are side views of the battery positioning structure of Fig. 17, as seen from the right and from the left thereof, respectively;

Fig. 17-C is a bottom view of the battery positioning structure of Fig. 17;

Figs. 21 and 22 are rear and side views of the amplifier unit of Fig. 18, with the hinged rear wall section broken and open, respectively;

Figures 1, 2, 2A:
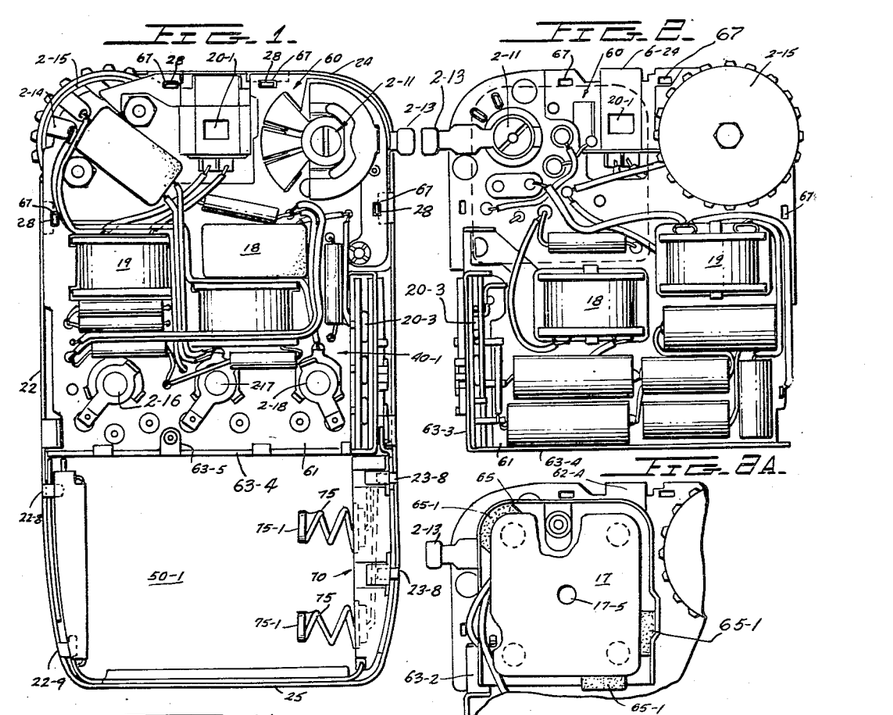

In the particular exemplification of the invention shown in Figs. 1 to 17, inclusive, all elements of the hearing aid except for the receiver are enclosed in a flat compact casing generally designated 20 small enough for inconspicuous wear on the body of the user, the casing being indicated by dash-dot lines in the circuit diagram Fig. 1-A. The receiver 12 such as an earphone or bone receiver is shown connected to the amplifier circuit of the hearing aid by two leads of a flexible cord generally designated 13. The amplifier may be of the type which operates with vacuum-type electron amplifier tubes, and in the particular exemplification of the invention described in connection with Figs. 1 to 17, inclusive, the amplifier operates with transistors, and all components of the amplifier are housed within the flat casing 20.

Figure 1A:
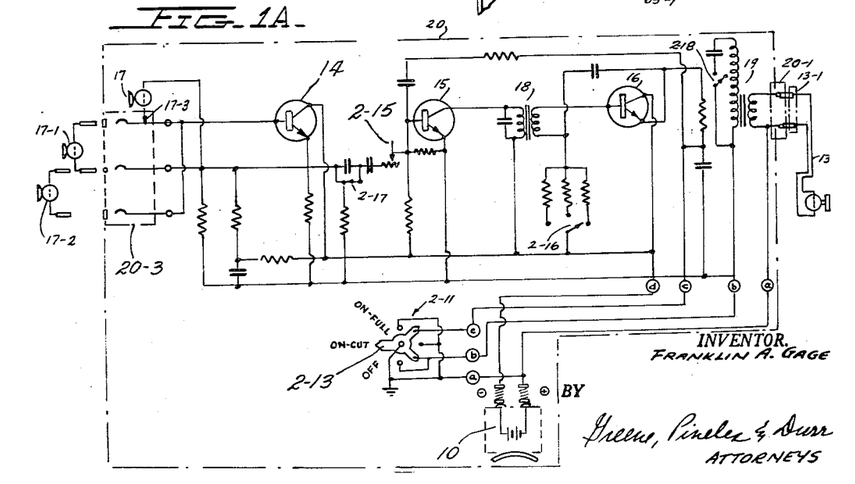

Fig. 1-A indicates diagrammatically, by way of example, one specific type of a hearing aid amplifier all components of which are mounted and arranged within the flat casing 20 in accordance with the principles of the invention. It includes a first gain amplifier stage operating with transistor 14, a second gain amplifier stage operating with transistor 15, and a power amplifier stage operating with transistor 16. A microphone 17, indicated as being of an electromagnetic type, delivers its signal output through an input circuit connected between the base and the emitter of transistor of the first gain amplifier stage. Transistor 14 supplies its amplified output through a circuit connected to the base and emitter of transistor 15 of the second gain amplifier stage. Transistor 15 supplies its amplified output through a circuit inducting coupling transformer 18 to the base and collector of the power stage transistor 16. The power stage transistor 16 delivers its output through a circuit including a coupling transformer 19 to the receiver 12, indicated as being of the electromagnetic type.

The amplifier stages of transistors 14, 15 and 16 are supplied with electric operating current by a battery unit 10. In the practical form of the amplifier shown, the battery unit 10 consists of two battery cells connected either in parallel or in series, although instead of two battery cells connection in parallel, a single battery cell may be used. A power supply control switch in the form of three-position power supply switch 2-11 has a movable switch member actuated by externally exposed actuating member 2-13 for actuating the switch member either to the On-Full position or to an intermediate On-Cut position or to the Off position as indicated by corresponding legends control. When the power supply switch 2-11 is in the On-Cut position, certain response control circuit elements are connected in the amplifier circuit for reducing the low frequency response, for instance, when desired by the user in a noisy space, without reducing the intelligibility of the amplified speech signals.

The amplifier is also shown provided with a volume control structure in the form of a rheostat 2-14 having an externally exposed control member 2-15 which permits the user to manually adjust the volume of the sound output delivered by the receiver 12.

The hearing aid amplifier of Fig. 1-A also has selectively operated control elements which make it possible to set the maximum power level of the amplifier to meet the specific requirements of the user unable to tolerate under any conditions the maximum available power level of the amplifier, and which also serves to cut the battery drain. In the amplifier circuit of Fig. 1-A, there is provided to this end a power control switch 2-16 with a movable switch element actuable to three positions, 1, 2 and 3 corresponding to the three different power levels at which the amplifier may be set, depending on the requirements of the user. The power level switch 2-16 is not exposed on the exterior of the hearing aid but is accessible only through a special setting opening in the amplifier casing as described hereinafter.

The hearing aid amplifier shown is also provided with additional selective response control means for enabling the person fitting the instrument to provide for additional reduction of the response in the low frequency range in accordance with the individual requirement of the user. In the amplifier shown, such additional selective low frequency control is provided by a low frequency control switch 2-17 movable between different positions for determining the low frequency response of the instrument when the power supply switch is in the On-Full position. The special low-cut switch 2-17 is not exposed on the exterior of the hearing aid, but is accessible only through a special setting opening of the amplifier casing as described hereinafter.

The hearing aid amplifier shown is also provided with further control elements for selectively reducing the high frequency response of the amplifier in accordance with the requirements of the user. In the form shown, the amplifier is provided to this end with a settable high cut switch 2-18 movable between two different settings for selectively changing the high frequency response in accordance with the requirements of the user. The special high-cut switch 2-18 is not exposed on the exterior of the hearing aid, but is accessible only through a special setting opening of the amplifier casing as described hereinafter.

The present invention provides a novel casing and amplifier chassis arrangement which simplifies the manufacture of the hearing aid components of a hearing aid of the type described above and their assembly in the casing as well as the servicing of the hearing aid and also enables easy and fool-proof replacement of the battery whenever desired by the user.

In the practical exemplification of the invention structurally shown in Figs. 1 to 17, all components of the hearing aid amplifier shown diagrammatically in Fig. 1-A, except for the receiver 12 and its supply cord 13, are housed in a flat casing 20 small enough for inconspicuous wear hidden on the body of the user. For the sake of clarity, the casing 20 and associated parts are shown enlarged on a scale 1 to 2.

In the form shown, the casing 20 is formed of two facing walls of sheet metal, to wit, the front wall 21, the rear wall 41 with its hinged wall section 51 confining between them a flat casing space comprising an amplifier compartment 20-1 in which the amplifier components are housed, and a battery compartment 30-1 in which the battery positioning structure and the battery elements are housed. In the particular battery casing 20, both casing walls 21, 41, 42 are formed of thin, strong sheet metal, such as stainless steel about .015 inch thick.

The front casing wall 21, shown in detail in Figs. 5 to 8-B, has a generally extended wall surface bounding one of the flat sides of the casing space. Casing wall 21 has two lateral border or rim portions 22, 23 bordering the opposite lateral sides of the casing space and two transverse border or rim portions 24, 25 bordering the opposite transverse side of the casing space, the upper rim portion 24 forming the upper border of the amplifier compartment 40-1 and the bottom rim portion 25 forming the bottom border of the battery compartment 50-1.

Figures 9, 10:
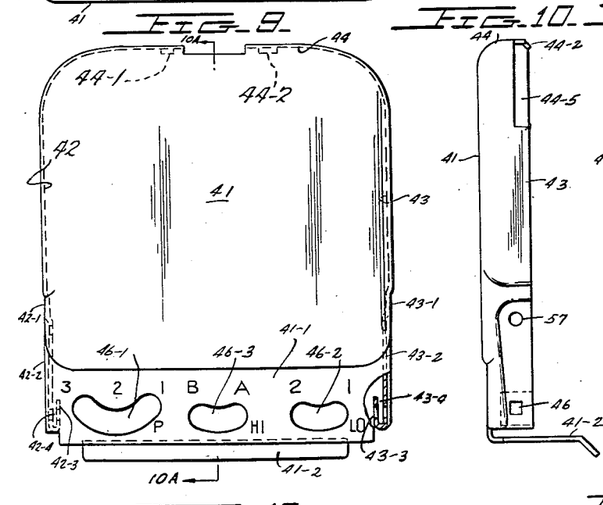
Fig. 9 is a view similar to Fig. 3 of the upper amplifier wall section of the rear wall.
Fig. 10 is a side view of the wall section of Fig. 9, seen from the right.
Figure 10A:
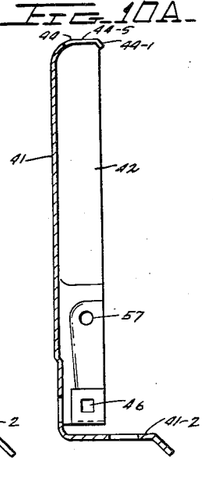
Figures 10B, 10C, 13:
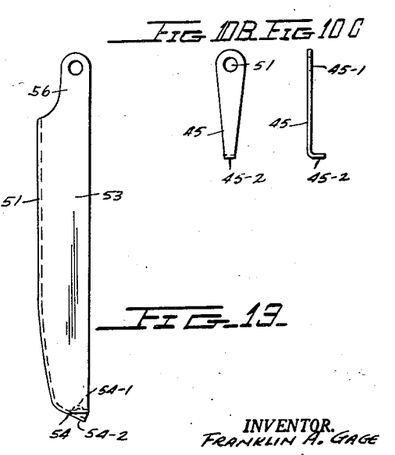
Figure 11:
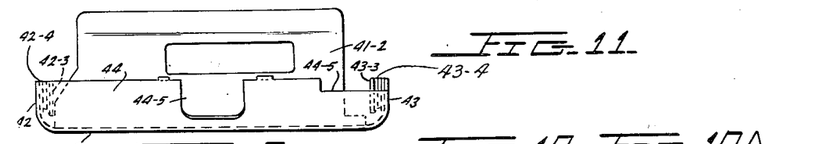
Fig. 11 is a top view of the wall section of Figs. 9 and 10.

The rear casing wall 41, shown in detail in Figs. 9 to 11, overlies the amplifier compartment 40-1 and is movably joined to its battery wall section 51 which overlies the battery compartment 50-1. The main rear wall section 41, which may conveniently be called the amplifier wall section, has two lateral rim portions 42, 43 bordering opposite lateral sides of the amplifier compartment 40-1 and a transverse rim portion 44 bordering the transverse upper side of the amplifier compartment 40-1 space. The rear battery wall section 51, shown in detail in Figs. 12, 13, 14, has two lateral rim portions 52, 53 bordering the opposite lateral sides of the battery compartment 50-1, and a transverse rim portion 54 bordering the transverse outer side of the battery compartment 50-1. The rim portions 22, 23, 24, 25 of the front casing wall 21 are of somewhat greater depth than the rim portions 42 through 43 and 52 through 53 of the rear casing wall sections 41, 51, and they complement each other in forming lateral confining walls around the amplifier compartment 40-1 and battery compartment 50-1.

The front wall 21 is formed by a suitable drawing process out of a straight strong metal sheet so that its four rim portions 22 through 25 merge into each other and in to its flat main wall area along smooth curve formations. The rear amplifier casing wall section 41 is similarly formed of sheet metal so that its three rim portions 42, 43 and 44 merge into each other and into its flat main wall area along smooth curve formations. The rear battery wall section 51 is similarly formed of sheet metal so that its three rim portions 52, 53, 54 merge into each other and into its flat main wall area along smooth curve formations. The two rear casing wall sections 41 and 51 are hingedly joined to each other in a novel way so that when they form with the front wall 21, a closed casing enclosure around the amplifier and battery compartments the exterior surfaces of the main flat wall sections and of their side rims present substantially continuous smooth surfaces which merge smoothly in to each other.

Figures 3, 3A, 3B, 4, 4A:
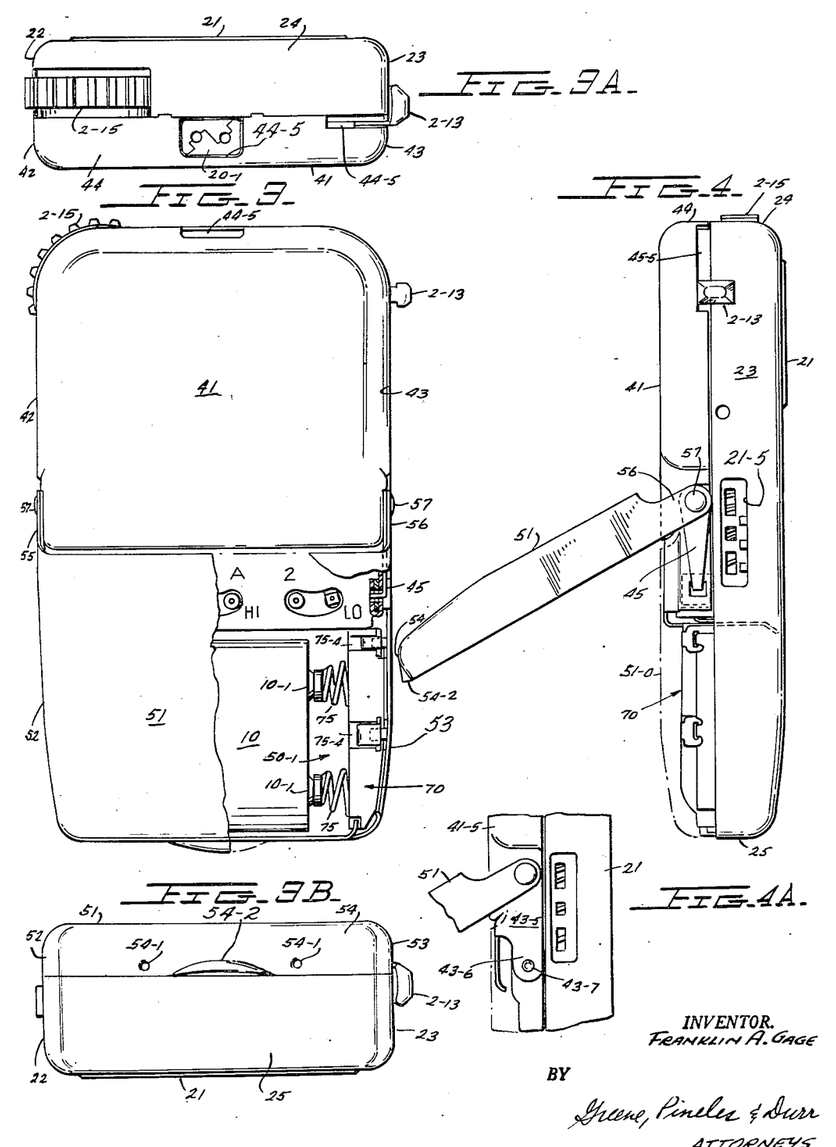

In the closed position, Figs. 3 through 4, and 9, the upper region of the lower rear casing wall section 51 overlaps an inwardly slightly recessed wall region 41-1 of the upper rear wall section 41. Furthermore, in their closed position, the upper side rim portions 52, 53 of the rear wall section 51 overlap inwardly recessed wall regions 42-1, 43-1 of the side rim portions 42, 43 of the upper rear casing wall section 41. The lower rear casing wall section 51 has also two upward rim arm extensions 55, 56 which are pivotally joined, as by pivot pins 57 to the underlying side rim portions 42-1, 43-1 of the upper rear wall section 41 so as to permit tilting movement of the lower rear wall section 51 relatively to the upper rear wall section 41 between an open position, such as shown in Fig. 4, and the closed position indicated in Fig. 4 by dash-line 51-0.

In the closed position of the casing (Figs. 3, 3-A, 3-B, and 4), the upper region of the lower casing wall section 51 and its two side rim extensions 55 and 56 overlie recessed main wall portion 41-1 and recessed rim portions 42-1, 43-1 of the upper rear wall section 41 so that all exposed exterior surfaces of the two rear casing wall sections 41, 51 present substantially continuous smooth exterior surfaces when the casing walls 21, 41, 51 are in their closed position, while permitting the lower rear casing wall section 51 to be tilted outwardly along its hinge connections 57 to the open position (Fig. 4) for exposing the battery compartment 50-1 to permit ready replacement of the battery 10. The recessed rear casing wall portion 41-1 is recessed relatively to the adjoining main surface of the upper rear casing wall section 41 only by the thickness of the sheet metal out of which the two casing wall sections 41, 51 are formed. Similarly, the recessed side rim portions 42-1, 43-1 are inwardly recessed relatively to the adjoining side rim portions 42, 43 of the upper rear casing wall 41 only by the thickness of the sheet metal out of which the two casing wall sections 41, 51 are formed. The lower recessed wall region 41-1 of the upper rear casing wall section 41 is provided with an inwardly bent sheet extension 41-2 which serves as a partition which separates the amplifier compartment 40-1 of the casing 20.

In the form shown, the hinge pins 57 by which the rim arms 55, 56 of lower rear casing section 51 are pivotally joined to the underlying recessed side rim portions of the upper casing wall 41 serve also as mounting supports for two locking arms 45 arranged to be tilted around the pivot pins 57 between the normal locking position in which they are shown in Figs. 3 and 4 to an outwardly tilted position either to the left or to the right of the position in which one such locking arm 45 is shown in Fig. 4. The locking arm 45 has a pivot hole 45-1 with which it is pivotally seated on the respective pivot pin 57, and at its free end it has an inwardly bent locking tooth 45-2 which serves to interlock the upper rear casing wall section 41 with the front casing wall 21 as will be explained hereinafter. The two locking arms 45 are arranged to pivotally move over regions 42-2, 43-2 of the underlying portions of the side rims 42, 43 of the upper rear wall section 41 which are further inwardly recessed relatively to the recessed rim regions 42-1, 43-1 by the thickness of the sheet metal out of which the two locking arms 45 are formed. This arrangement assures free tilting movement of the side rims 53 of the lower battery rear casing wall 51 around its pivots 57 with its hinge arm portions 55, 56 sliding over the underlying locking arms 45 and the further recessed rim portions 42-2, 43-2 of the upper casing wall section 41.

The recessed wall portion 41-1 of the upper rear casing wall 41 is provided with cut-outs or windows 46-1, 46-2, 46-3 through which are exposed the setting switches, the power setting switch 2-16, the low cut switch 2-17 and the high cut switch 2-18 of the amplifier chassis, the operation of which was explained above in connection with Fig. 1-A. These windows 46-1, 46-2, 46-3 are normally covered by the lower rear casing wall section 51 when it is in its normal inwardly tilted closed position.

In accordance with the invention, the rear casing wall section 41 is arranged to remain firmly interlocked with the front casing wall 21 in the closed position shown in Figs. 3 through 4 for maintaining the amplifier compartment enclosed and protected against any disturbance in normal use while permitting removal of the rear casing wall section 41 by a technician for gaining access to service or check the amplifier chassis which is positioned in the underlying closed amplifier compartment 40-1 of the casing 20.

The two outwardly projecting front-wall rim lugs 24-1, 24-2 are provided with retainer openings or slits 24-3, 24-4 (Figs. 5 through 8) arranged to receive retainer teeth 44-1, 44-2 extending in an inwardly bent direction from the overlying edge of the upper rim 44 of the rear casing wall section 41. The retainer teeth 44-1, 44-2 of the rear casing wall rim 44 and the retainer openings 24-3, 24-4 of the retainer lugs 24-1, 24-2 of the front wall upper rim 24 in which they are seated interlock the rear casing wall 41 with the front casing wall 21 along their upper complementary rim edges 24, 44 in a position in which they complete the enclosure around the upper space of the amplifier compartment 41-1.

The upper rear casing wall section 41 is also arranged to be retained locked in its complementary abutting engagement along the edges of its rims 42, 43, 44 with the rims 22, 23, 24 at the front casing wall 21 by locking means provided along the lower region of the rear casing wall 41. In the form shown (Figs. 3, 4, 9, 10) the downward side rim portions 42-1, 43-1 of the rear casing wall 41 have inwardly bent-over overlapping tongue portions 42-3, 43-3 which provide thereon two retainer pockets 42-4, 43-4 shaped for receiving and seating therein recessed rim edge tongue portions 22-1, 23-1 projecting outwardly from the side rims 22, 23 of the front casing wall 21. The rear casing wall retainer pockets 42-3, 43-3 and the front casing wall tongues 22-1, 23-1 which are seated therein have formed therein aligned interlocking openings 46, 26, respectively, which are interlockingly engaged by the locking projection 45-2 of the two elastic locking arms 45 overlying the two side rim portions 42-2, 43-2 of the rear wall casing 41, thereby completing the interlocking connections of the rear casing wall 41 to the amplifier compartment section of the front casing wall 21.

Since the locking arms 45 are of elastic sheet metal, they may be elastically flexed in outward direction to lift their locking teeth 45-2 from the aligned retainer pocket openings 46, thereby releasing the front casing wall locking tongues 22-1, 23-1 from their interlocking engagement with the rear casing wall retainer pockets 42-4, 43-4 whereupon the rear wall section 41 may be tilted outwardly along its upper locking teeth 44-1, 44-2 in the retainer slits 24-3, 24-4 of the upper front casing wall rim 24 and removed therefrom, thereby exposing the amplifier compartment 40–1 in the upper part of the front casing wall 21.

When the locking arms 45 of the rear casing wall section 41 are elastically bent to a lifted position where their locking tooth 45–2 is withdrawn from the retainer pocket openings 46, each locking arm may be tilted to the right or left from its locking position (in which it is shown in Fig. 4), the battery casing wall section 51 having been previously tilted to an outward open position such as shown in Fig. 4. With the locking arms 45 so tilted to an outward position, the upper rear casing wall section 41 may be readily assembled in its interlocked closed position along the aligned rim edges of the front casing wall 21. To this end, the downwardly projecting rear casing wall rim locking teeth 44–1, 44–2 are first inserted into the upper rear casing wall retainer slits 24–3, 24–4, whereupon the rear casing wall section 41 is tilted until the front casing wall rim edge projections 22–1, 23–1 enter the rear casing wall retainer pockets 42–4, 43–4 of the upper rear casing wall section 41. In the so assembled condition of the rear casing wall section 41 along the facing rim edges of the front wall section 21, the two rear casing wall locking arms are flexed away from the underlying side rims 42, 42 and tilted back to bring their locking teeth 45–2 opposite and release them into the interlocking engagement with the aligned rim pocket and tongue locking openings 46 and 26 of the so assembled closed casing walls 21 and 41.

One form of such interlocking arrangement will now be explained in connection with Figs. 1 through 4 and 5 through 17, which show the interlocking engagement whereby the rear wall casing section 41 and the front casing wall 21 are positively retained in their closed position around the amplifier compartment.

The upper rim 24 of the front casing wall 21 has along its edge two outwardly projecting edge regions or 24–1, 24–2 which are inwardly recessed by the thickness of its sheet material so as to lie in engagement with and under the overlying surface of the edge of the upper rim 44 of the rear casing wall section 41 when they are in the closed position shown in Figs. 3 through 4.

In such closed position, with the upper rear casing wall 41 so locked in the assembled closed position to the front casing wall 21 (Figs. 3 through 4), the lower rear battery casing wall section 51 may be tilted around its pivot pins 57 to its closed position in which it is retained by the interlocking engagement of inwardly bent lower rim detents 54–1 which are elastically sprung into retainer openings 25–1 in a recessed ledge projection 27 of the lower front casing wall rim 25 (Figs. 5, 6, 8, 12, 13, 14). To facilitate ready release and opening of the battery casing wall 51 from the closed position (Figs. 3, 3–B) to the open position, its lower rim 54 is provided along its lower rim edge with an outwardly bent grip lip 54–2 arranged so that upon gripping it, its two detents 54–1 may be with a relatively small force withdrawn by a sliding motion from their locking engagement with the retainer openings 25–1 of the lower front wall casing rim 25 whereupon the battery casing wall 51 may be freely tilted in upward direction (Fig. 4) for exposing the battery compartment 50–1 with the battery 10 mounted therein as well as the recessed region 41–1 of the upper rear casing wall 41 with its windows 46–1, 46–2, 46–3 (Figs. 1, 3, 4) which make accessible for setting the three setting switches 2–16, 2–17, 2–18 of the amplifier chasis.

One of the two opposite casing wall structures 21, 41 is also so arranged as to enable ready and positive mounting of the amplifier assembly or chassis within the amplifier compartment 40–1 of the amplifier casing 20 and the battery positioning elements before the two opposite casing walls 21, 41 are assembled in their interlocked position.

In the exemplification shown in Figs. 1 through 17, the upper amplifier compartment space 40–1 of the front casing wall 21 is arranged to hold affixed therein the amplifier assembly comprising all the elements of the amplifier shown in the circuit diagram of Fig. 1–A and the lower battery compartment space 50–1 of the front wall casing 21 is arranged to hold affixed therein battery positioning elements which retain the battery or the battery elements in their operative position and establish circuit connections between the battery terminals and the circuit elements of the amplifier.

Figures 15, 15A, 16, 17, 17A, 17B, 17C:
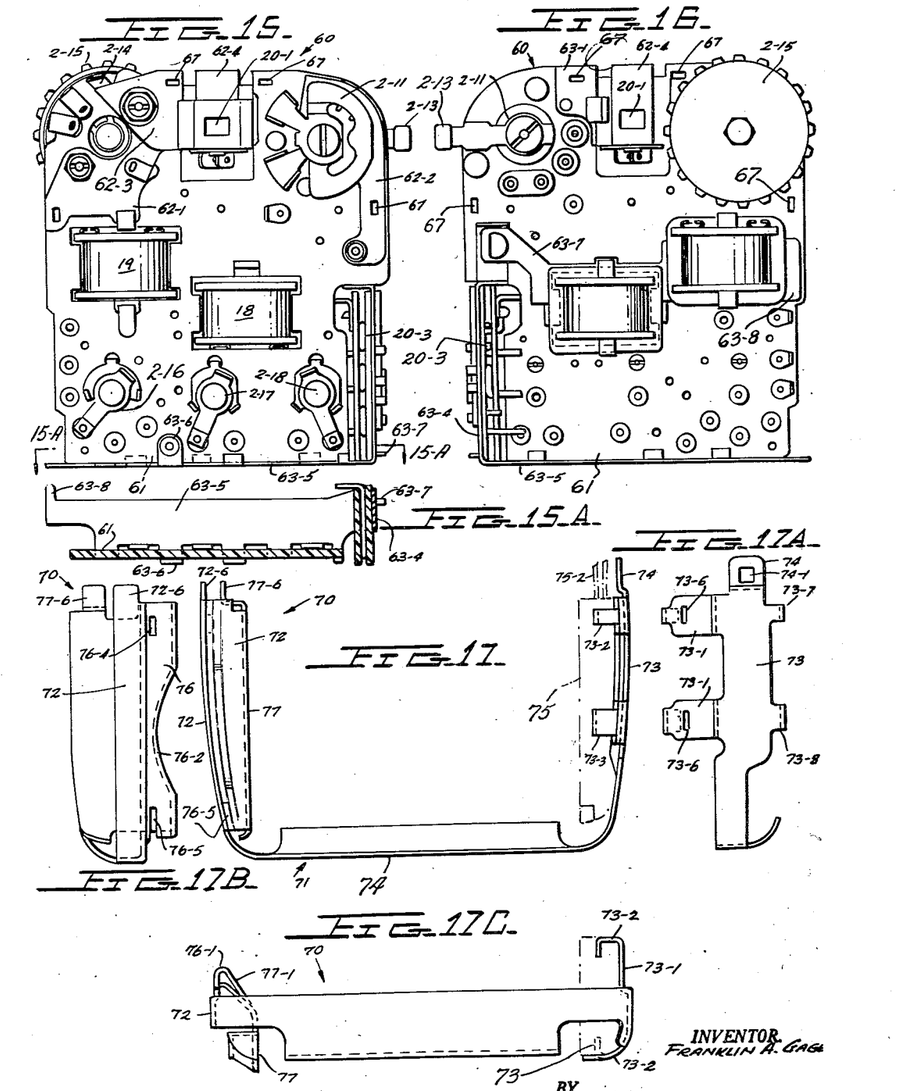

In the form of the invention shown in structural Figs. 1 through 17, all components and circuit elements of the amplifier which are shown diagrammatically in Fig. 1–A, are mounted and assembled on an amplifier chassis structure generally designated 60 which is shown in fully assembled condition in Figs. 1, 2, 2–A, the amplifier chassis structure without amplifier components wired and soldered thereto being shown in Figs. 15 and 16. The amplifier chassis structure 60 comprises a frame member, which, in the form shown, consists of a thin, hard and stiff frame sheet or plate 61 of insulating material such as a thick paper sheet impregnated with a hard synthetic resin material or the like, to which are affixed a number of the major ones of the structurally larger components of the amplifier shown diagrammatically in Fig. 1–A. The amplifier components which are affixed to the amplifier chassis frame plate 61 include the power supply switch 2–11 with its exposed rotatable control knob 2–13 mounted on one upper corner region of the frame plate 61 so that the control knob 2–13 shall protrude through a cut-out opening 44–5 in the edge region of the upper rim corner of the upper rear casing wall 41 (Figs. 1, 2 through 4, 10, 11); they also include the volume control rheostat 2–14 with its rotatable external actuating member 2–15 which are mounted on the other upper corner of the chassis frame plate 61 so that the volume control actuating member 2–15, shown in the form of a wheel-like knob, shall be exposed on the exterior of the casing 20 through a cut-out 24–5 in the edge region of the corresponding upper rim corner of the front casing wall 21 (Fig. 1). With this arrangement, the rotatable actuating members 2–11, 2–15 of the power supply switch 2–11 and the volume control rheostat 2–14, respectively, are exposed on the two opposite upper corners of the small thin casing 20 for enabling the user to turn the respective control knob in one or the opposite direction for selectively bringing the power supply switch 2–11 to either one of its three settings Off, On-Cut, On-Full, and for selectively bringing the volume control rheostat 2–14 to any desired volume position.

To the lower region of the amplifier chassis frame plate are affixed three other control switches of the amplifier, to wit, the power setting switch 2–16, the low cut switch 2–17, the high cut switch 2–18 (Figs. 1, 15) so that the rotary pivotally mounted respective switch member may be actuated to its different setting through the respective setting windows 46–1, 46–2, 46–3 of the overlying bottom region of the upper rear casing wall section 41 (Fig. 11). Figs. 15, 16 also show by corresponding reference numerals the other amplifier components of the hearing aid amplifier of Fig. 1–A which are affixed to the chassis frame plate 61. These amplifier components include a receiver cord socket 20–1 which has two socket terminals for receiving the plug pins of a receiver cord plug 13–1. They also include a microphone socket 20–3 with three socket terminals, the central one of which is polarized relatively to the two outer ones for receiving the polarized plug pins of either an external microphone 17–1 or an inductive telephone pickup 17–2. As indicated in Fig. 1–A, one of the two socket terminals of microphone socket 20–3 which serve to connect the polarized plug of the external microphone 17–1 to the first amplifier gain stage is arranged to open at contact 17–3 for disconnecting the internal microphone 17 from the input circuit when the external microphone 17–1 is connected thereto. However, when the microphone pickup 17–2 is connected through its polarized plug to the corresponding socket terminals of microphone socket 20–3 as indicated in Fig. 1–A, both the telephone pickup 17–2 and the internal microphone 17 are connected in parallel to the amplifier input circuit for supplying to the user the amplified telephone message and also sound picked up by the internal microphone 17 of the hearing aid.

The receiver cord socket 20–1 is shown affixed to the upper edge region of the chassis frame plate 61 (Fig. 1, 2, 15) so that its socket terminals are exposed through a rim edge cut-out 44–5 in the upper rear casing wall rim 44 for plugging into the socket openings the plug pins of the receiver cord plug 13–1 (Figs. 1, 2, 3–A, 11, 15, 16). The external microphone socket 20–3 is mounted along one side edge region of the amplifier chassis plate 61 so that the three microphone socket terminals are exposed through a rim cut-out opening of front casing side rim 23 for plugging in to the respective pair of their polarized microphone socket terminals the polarized plug pins of either the external microphone 17–1 or of the telephone pickups 17–2.

As indicated in Figs. 15 and 16, to the opposite sides of the amplifier chassis plate 61 are also affixed the two transformers, the coupling transformer 18, and the output transformer 19 (Figs. 1 to 15, 16) by suitable sheet metal brackets affixed as by rivets to the chassis plate 61, suitable cut-outs in the chassis plate 61 being provided for locating therein the two transformers 18, 19. The chassis plate 61 has also secured thereto, as by rivets, additional sheet metal elements which serve as connector parts between different circuit elements of the amplifier and also metal rivets which likewise serve as connector parts between different circuit elements of the amplifier. Thus, metal sheet elements 62–1, 62–2, 62–3, 62–4, are affixed to one side of the chassis plate 61 shown in Fig. 15 and metal sheet elements 63–1, 63–2, 63–3, 63–4, 63–5, 63–7, 63–8 are secured to the other extended side of the insulating chassis. The upper part of a side arm 63–4 of a shelf-like sheet metal strip 63–5 is secured to the lower edge region of the chassis plate 61 at the front of the side thereof seen in Fig. 16 by a fastening lug 63–6.

Figures 5, 6, 6A, 7:
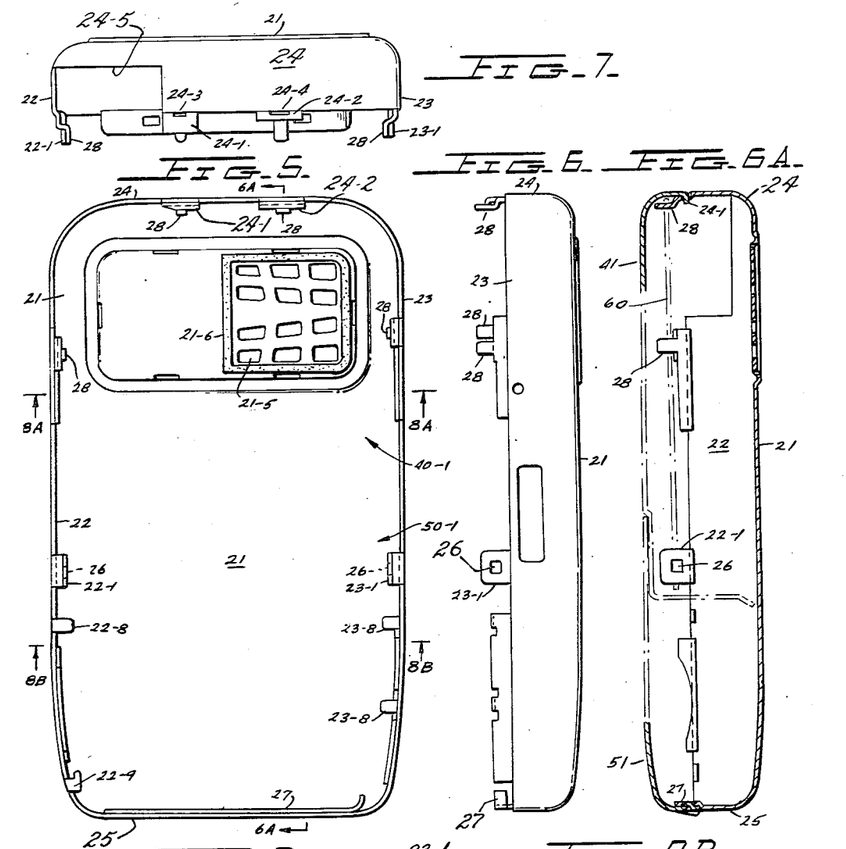
Figure 8:
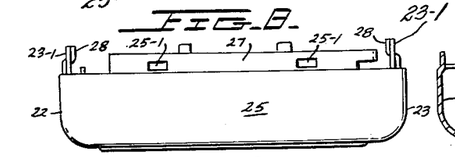
Figure 8A:
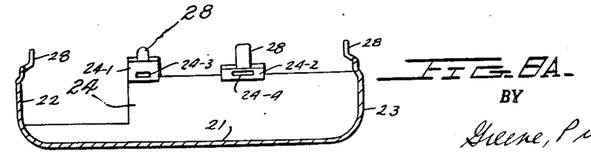
Figure 8B:
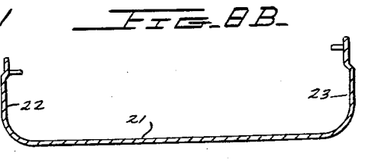

The side of the chassis plate seen in Figs. 2–A and 3 has also attached thereto a cam-like microphone mounting enclosure 65 of hard sheet metal, the rear side of which is secured as by soldering to metal strip parts 62–4, 63–2 which are affixed to and are exposed on the side of the chassis plate 61 seen in Figs. 2–A and 16. Within the cam-like microphone enclosure 65 is mounted the shallow microphone 17 (Fig. 2–A) shown enclosed in a rectangular casing fitting within the microphone cam enclosure 65, the rear side of the microphone casing being yieldably suspended in the cam enclosure 65 as by spongy elastomer pads 65–1 such as sponge rubber. The front side of the microphone casing 17 (as seen in Fig. 2–A) is provided with an opening through which sound is propagated to a microphone driving diaphragm not shown, but which is enclosed within the microphone casing so as to cause the microphone to deliver to the in-put circuit of the amplifier 20 an electric signal corresponding to the propagated sound. In order to provide a substantial acoustic chamber around the front side of the microphone as seen in Fig. 2–A, the overlying part of the front casing wall 21, which has some propagating openings 21–5, has affixed thereto, as by cement, a flexible wall enclosure 21–6 of yieldable sound-impervious elastomer material which engages the facing border region of the microphone casing wall as seen in Fig. 2–A. The upper part of the front wall casing as seen in Fig. 5 which lies over the front side of the microphone (as seen in Fig. 2–A) is provided with openings 21–5 propagating sound to the sound pervious front casing wall of the microphone 17 as seen in Fig. 2–A. A sound impervious acoustic seal is provided between the sound pervious front casing wall of the microphone 17 as seen in Fig. 2–A and the overlying sound pervious front casing wall portion 21–5. To this end, a flexible wall enclosure 21–6 of yieldable sound impervious elastomer sheet material is affixed around the periphery of the sound pervious front wall casing 21–5, on the inner face thereof overlying the sound pervious wall of the encased microphone 17 so that the yieldable wall enclosure 21–6 shall form a yieldable acoustic seal around the acoustic space between the sound pervious front casing wall portion 21–5 and the sound pervious front wall of the encased microphone 17. The amplifier chassis structure 60 in the part of the microphone casing 20 within which it is mounted are provided with interfitting locating retainer elements for locating and retaining the amplifier chassis in the desired fixed position within the amplifier casing in which it is shown in Figs. 1 through 4. In the form shown, the amplifier chassis is provided to this end with four locating openings or slits 67 arranged to receive and interlockingly engage four locating and retainer projections or tongues 28 provided on four peripherally displaced rim edge regions of the border rims 22, 23, 24 extending along the upper part of the front casing wall 21 (Figs. 1, 2, 5 through 7, 15, 16). As seen in these figures the locating and retainer tongue projections 28 of the upper front casing wall rim edge regions 22, 23, 24 are displaced inwardly from the rim edges by a distance greater than the thickness of the wall sheet material, the distance being such that the tongue projections enter the locating slits 67 of the chassis structure 60.

The casing portions of the battery compartment 50–1 are arranged to hold detachably affixed therein a battery positioning structure generally designated 70 as shown in Figs. 1, 3, 4, in assembled position within the casing and also shown in detail Figs. 17 through 17–C.

The battery positioning structure 70 is arranged for detachable mounting in interlocked position within the battery compartment 50–1 of the front casing wall 21. It comprises an elongated frame member 71 of sheet metal bent into generally U-shape and having a transverse arm 74 arranged to fit against and engage the front wall casing bottom rim 25 and two side arms 72, 73 arranged to fit against and engage the opposite portions of front wall casing side rim 22, 23 bordering the battery compartment 50–1. Battery positioning side arm 73 has along each of its opposite elongated side edges a pair of clamping arm projections 73–2, 73–3 and 73–7, 73–8 embracing and holding clamped between them an elongated insulating battery terminal mounting member 76. The terminal mounting member has along its opposite sides interlocking recesses 74–1 which are unlockingly engaged by laterally bent locking end projections of the respective pairs of clamping arms 73–2, 73–3 and 73–7, 73–8 so that the insulating terminal mounting member 74 forms a fixed part of battery positioning side arm 73.

On its elongated side facing the battery compartment 50–1, the insulating terminal mounting member 75 has two coiled metallic spring terminal members 75–1 each having an anchoring portion insulating affixed within underlying seating recesses of the insulating member 70. Two insulating leads 75–2 are connected as by soldering, to the portions of the spring terminal members 75–1 which are insulatingly mounted in the mounting member 70 to provide insulated circuit connections from the two battery terminals to the proper elements of the amplifier circuit.

The other sheet metal side arm 72 of the battery positioning structure 70 has a lateral extension 76 overlappingly bent into a battery seating ledge 77 arranged to seat one extended end surface of the battery 10 after it is inserted between the seating ledge 77 and the facing battery terminal spring members 75–1 (Figs. 1, 3, 17 through 17–C).

To permit easy removal of the battery from its seat between the battery seating ledge 77 and the spring terminal members 75–1, the seating ledge 77 merges into the battery positioning side extension 76 along a tapered entry region 77–1 so that, after first placing the battery with the two battery terminals 10–1, 10–2 positioned at one flat side of the battery, against the inward ends of the battery terminal spring 75–1, the opposite seating end surface of the battery may be pushed inwardly against the tapered battery seat ledge extension 70–1 until the battery end surface facing it reaches its inward position on the seating ledge 77. The outwardly facing bent edge region 76–1 of the battery positioning arm 72 is provided along its intermediate region with a depression 76–2 for enabling the user to place a finger against an intermediate end wall portion of the battery 10 which is seated against the battery seating ledge 77, thereby enabling ready lifting of the battery end wall from its position on the seating ledge 77 and removal of the battery from its compartment 50–1.

Means are also provided for positively interlocking the battery positioning structure in its operative position within the casing 20, in which its three arms 72, 73, 74 are held in engagement with the facing front casing side rim regions 22, 23, 25. In the form shown, side arm 73 is provided to this end along its lateral arm extensions 73–1 (Fig. 17–A) with retainer openings or slits 73–6 and the end portion of the battery positioning arm 73 is provided with an inwardly recessed retainer lug 74 having a retainer opening 74–1. The other battery positioning arm is provided along its ledge extensions 76 with two retainer openings or slits or recesses 76–4, 76–5. In addition, this other battery positioning arm 72 and its battery seating ledge 76 are provided with inwardly recessed retainer end projections 72–6, 77–6. The battery compartment region of the front casing wall side rim 23 is provided with two inwardly recessed and laterally bent locking tongue portions 23–8 arranged to enter and interlock with the retainer opening slits 73–6 of the adjacent battery positioning arm 73 when it engages the adjacent front casing wall side rim 23. Similarly, the opposite front casing side wall rim portion 22 is provided with two inwardly recessed and laterally bent locking tongue projections 22–8, 22–9 arranged to enter and interlock with the interlocking openings or slits 76–4, 76–5 of the adjacent battery positioning arm 72 when it engages the adjacent front casing wall side rim 22. The battery positioning structure 70 is arranged to be placed in its interlocked position with the facing front casing wall rim regions 22, 23, 25 before the amplifier chassis 60 is positioned in its interlocked position with the adjacent front casing wall side regions 22, 23, 24. The battery positioning structure may be readily placed in its interlocked position against the adjacent front casing wall side rim portions 22, 23, 25. This is done by placing the battery positioning arm 73 against the adjacent portion of the front casing wall side rim 63 with the retainer slits 73–6 of the battery positioning arm 73 interlockingly seated over the inwardly bent interlocking tongues 23–8 of the adjacent front casing wall side rim 23. Thereupon, the opposite battery positioning arm 72 is moved into its interlocked position by seating its two locking recesses 76–4, 76–5 on the inwardly bent interlocking tongues 22–8, 22–9 of the adjacent front casing wall side rim 22.

After so mounting the battery positioning structure 70 in its interlocked position against the adjacent front casing side wall rims of the battery compartment 51, the assembled amplifier chassis structure 60 is then placed in its interlocked position with the interlocking tongues 28 of the front casing wall side rims 22, 23, 24 engaging the interlocking slits of the amplifier chassis structure 60 as described above.

When the amplifier chassis structure 60 is placed in interlocking engagement with the front casing wall side rims 22, 23, 24 tongue, certain interlocking portions of the amplifier chassis structure serve to complete the interlocking mounting of the battery positioning structure 60 within the front wall casing 21. In the form shown, the chassis structure 60 is provided to this end with a lateral locking projection 63–7 which interlockingly engages and holds down the underlying interlocking tongue projection 74 of the adjacent battery positioning arm 73, passing the retainer recess 74 of the interlocking tongue 74 of the battery positioning arm 73. The opposite side of the chassis structure is provided with a tongue projection 63–8 (Fig. 15–A) arranged to hook over and lock in position the locking projection 77–6 of the battery seating ledge 77 of positioning arm 73 while the outer side edge of the amplifier chassis tongue projection 63–8 presses the tongue projection 72–6 against the adjacent portion of the front casing wall side rim 22.

Figure 12:
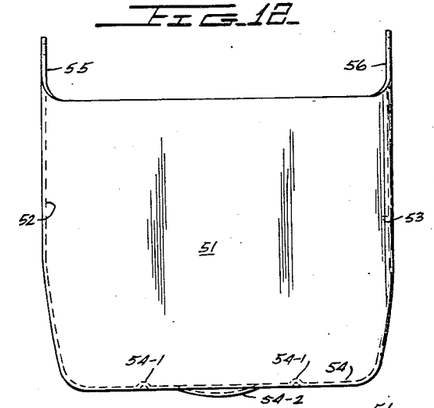
Fig. 12 is a view similar to Figs. 3 and 9 of the battery wall section of the casing rear wall.
Figure 14:
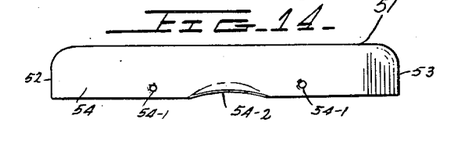
Fig. 14 is a bottom view of the battery wall section of Fig. 12.

Fig. 4–A shows a modified mounting arrangement and interlocking connection between the front casing wall 21 and its amplifier casing wall section 41. In the modification of Fig. 4–A, amplifier casing wall section 41–5 (corresponding to the amplifier casing wall section 41 described above in detail in connection with Figs. 9 through 13) is provided along the lower ends of its side rims 43–5 with the pivot arm extensions 43–6 having inwardly projecting pivot pins 43–7 arranged to enter pivot holes provided in underlying inwardly recessed ledge portions 23–7 of the front casing wall side rim. With each battery casing side wall rims 43–5 (of Fig. 4–A) provided with similar pivot connections to the underlying recessed front casing wall side rim ledge portions 23–7, the battery casing wall 41 may be pivoted around its pivot pins 43–7 between a closed position with the front casing wall (such as shown in Figs. 3 through 4) and an outwardly tilted position wherein the upper battery casing wall rim 44 is tilted away from the upper front casing wall rim 24. With this arrangement, the upper battery wall casing rim 44 is arranged to be retained in its locked position with an underlying inwardly recessed ledge portion of the upper front casing wall rim 24 by providing the inwardly recessed ledge of the upper rim casing wall rim 24 retainer openings (not shown) similar to the ledge 27 and retainer openings 25–1 of the front casing wall bottom rim 25 (Fig. 8) arranged to be interlockingly engaged by inwardly projecting detents (not shown) similar to detents 54–1 of the battery casing wall rim 54 (Figs. 12 through 14). In other words, the upper rim of battery casing wall 41–5 of Fig. 4–A is retained in its locked position against the upper rim of the front wall casing 21 in the same way as the battery casing rim 54 of Figs. 1 to 4 is retained in closed position by engagement of its detents 54–1 with retainer openings in the inwardly recessed front wall casing rim ledge 27.

With the amplifier chassis structure 60 so retained in interlocked condition along the inwardly facing front casing wall rims 22, 23, 24 in which it holds locked to the front casing wall 21 the battery positioning structure 70, the amplifier chassis structure 60 will be retained locked in its position to the casing front wall 21 overlying rim regions 42, 43, 44 of the amplifier casing wall section 41 when it is positioned and affixed with to the adjacent rims of the front casing wall 21 in the manner explained above.

The amplifier arrangement shown diagrammatically in Fig. 1–A is designed for operation with NPN transistors. If the amplifier is to operate with PNP transistors, the circuit arrangement of Fig. 1–A is modified by reversing the lead connections of the amplifier to the battery 10 and also by reversing the polarity connections of the electrolytic capacitors C–1, C–5, C–6 of the amplifier circuit. The amplifier may be also modified by using instead of transistors midget amplifier tubes in a circuit of the type described hereinafter in connection with Figs. 18 through 27 or by having the amplifier operate with two amplifier tubes in the first two gain stages and having only the power stage operate with a transistor.

Figs. 18 to 27 show a modified form of hearing aid amplifier unit housed in another form of casing 5–20 exemplifying the invention. For the sake of clarity, the amplifier unit is shown greatly enlarged on a scale 1 to 2, with some of the figures being made on a still larger scale. The casing 5–20 has formed therein an amplifier compartment 5–21 and a lower battery compartment 5–22, in which an A-battery 10–A and a B-battery 10–B are replaceably mounted. The particular amplifier unit shown operates with vacuum type amplifier tubes and is designed for operation with relatively wide B-battery 10–B. The size of the amplifier casing 5–20 may be reduced by one-half of the width of the B-battery 10–B, and a user who does not require full amplifier power will be served in a very efficient manner with such amplifier operating with a B-battery of a width only half of the battery 10–B shown.

In the form shown, the amplifier casing 5–20 is formed of an extended front wall 5–41 and an extended rear wall 5–47 joined to the opposite sides of a relatively narrow border wall structure 5–24 made of electrically insulating molded material, for instance by injection molding. The border wall structure 5–24 is bound on all sides to the borders of the amplifier compartment 5–21, and its lower part encloses all sides of the battery compartment with the exception of its rear side which is open (Figs. 21, 22) for permitting replacement of batteries in the battery compartment 5–22. The upper part of the border wall structure 5–24 forms four relatively narrow border wall sections surrounding the four borders of the narrow amplifier compartment 5–21, the facing adjoining upper sections of the front wall 5–41 and rear wall 5–47 forming therewith a protective enclosure around the elements of the amplifier and the microphone housed therein. The narrow border wall sections 5–25, 5–27, facing the battery compartment, have mounted thereon electrical contact elements 5–31, 5–32, 5–33, 5–34, arranged to engage terminals of the A-battery 10–A and B-battery 10–B inserted into the positions shown in Fig. 21 within the battery compartment. Contact elements 5–31, 5–33, are shown in the form of compressible spring for assuring good contact between the battery terminals and the cooperating terminals 5–31 to 5–34 of the battery compartment, and also to facilitate replacement of the batteries. The contact elements 5–31 to 5–34 may be secured to the insulating border wall sections of the border wall structure 5–24 either by embedding them within the insulating wall structure, or by small rivets, or the like.

The upper border wall section 5–28 of the battery compartment 5–22 (Figs. 18, 21, 22) forms also one of the four border wall sections of the generally rectangular amplifier compartment 5–21. Lug or ear portions 5–35, 5–36, extending inwardly from the lower border wall section 28 and the upper border wall section 5–38 of the amplifier compartment 21 provide mountings for affixing thereto the amplifier assembly or chassis structure shown in Figs. 12 and 14, which is assembled prior to mounting and affixing to the lugs 5–35, 5–36 by screws 5–61, 5–62. The microphone 5–17 may be a conventional flat hearing aid microphone. The particular microphone 5–17 shown, is of the type described in the copending application of Richard W. Carlisle, Serial No. 56,516, filed April 9, 1949. The microphone 5–17 shown is made in the form of a flat unit held suspended on a vibration suppressing suspension structure shown in the form of a loop 5–63 of rubber-like elastometer damping material strung around a plurality of supporting ears of the border frame structure 5–24 and amplifier chassis structure housed in the amplifier compartment. The vibratory diaphragm of the microphone 5–17 faces the inner side of the upper sound pervious section of the front wall 5–41 of the amplifier casing which is provided with slits or openings 5–42 which render it pervious to the propagation of sound from the surrounding space to the diaphragm of the microphone 5–17.

In the form shown the front wall 5–41 and the rear wall 5–47 of the amplifier casing are made of thin, strong sheet material that has a smooth external surface, such as thin, smooth stainless steel sheet metal.

The front wall 5–41 is shown provided along its four borders with inwardly bent border portions 5–43 arranged to interfit with a raised shoulder portion 5–39 and the underlying wall region of the border wall structure 5–24.

The front wall 5–41 is also provided with means for firmly retaining it in assembled closed position on the border wall structure 5–24 while permitting easy removal therefrom whenever desired. To this end, the lower border wall section 5–26 and the upper border wall section 5–38 of the casing (Figs. 21 to 27) is provided with recesses for receiving rim detents 5–81, 5–82 formed on the upper and lower rim portions 5–43 of the front wall 5–41.

The bottom rim detents 5–81 of the front wall 5–41 are in the form of relatively long sheet projections extending from the rim edge and fitting correspondingly into the deep bottom recesses of the lower border section 5–26, so that after insertion therein the front wall 5–41 is tilted to the closed position (Fig. 25) in which its upper rim detents 5–82 will elastically snap into the recesses of the upper border wall section.

Figure 27:
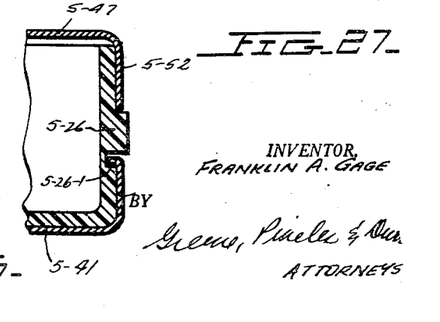

Fig. 27 shows the lower border wall section 5–26 of the border wall structure 5–24 with its relatively deep recess arranged to receive and lock the relatively long detent 5–81 of the lower border portion 5–43 of the front wall 5–41.

Figure 25:
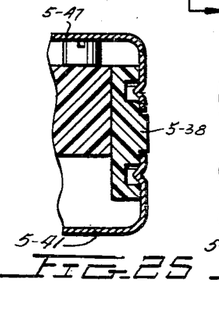
Fig. 25 is an enlarged cross-sectional view along line 25—25 of Fig. 23.

Fig. 25 shows the upper wall portion 5–43 of the front wall 5–41 with its shallow detent interlockingly engaging with an elastic snap action the shallow locking recess 5–83 of the upper border wall section 38 of the wall structure 5–24.

As explained above, the rear wall 5–47 overlies and is affixed to the rear side of the amplifier compartment 5–21 and has a lower battery wall section 5–48 hingedly connected thereto. The rear wall 5–47 is also provided with novel means of the invention for tilting it from the closed position shown in Figs. 19 and 22 to an outwardly tilted position for providing access to the normally closed amplifier compartment 5–21 and enable the person fitting the instrument to set internal control switches of the amplifier in accordance with the requirements of the user and also for replacement of tubes.

The main part of the rear wall 5–47 overlying the amplifier compartment 5–21, is provided along its upper and two side borders with inwardly bent rim sections 5–51, 5–52 fitting against the raised shoulder portion 5–39 of the border wall structure 5–24 and against its underlying border wall portions. The lower edge of the rear wall 5–47 terminates along lower border wall section 5–28 of the amplifier compartment 5–21 and is slightly displaced in inward direction (Fig. 22) so as to fit against the underlying edge of the intermediate border wall section 5–48.

Figure 19:
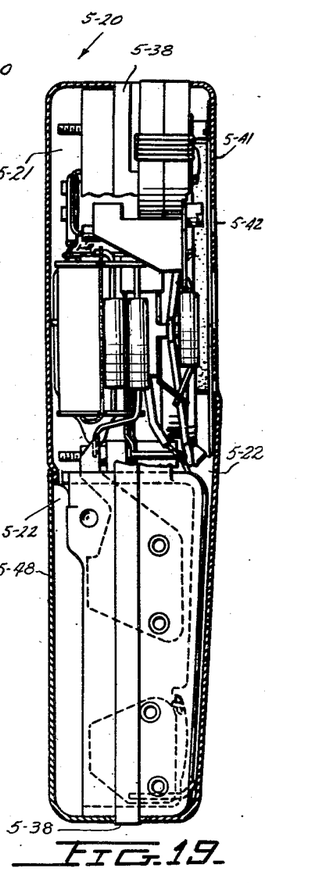
Fig. 19 is a side view of the amplifier unit of Fig. 18 as seen from the left.
Figure 20:
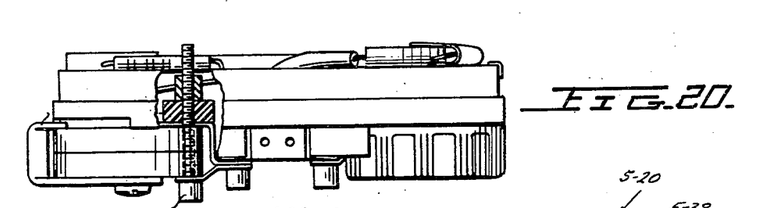
Fig. 20 is a top view of the amplifier unit of Fig. 18.
Figure 21:
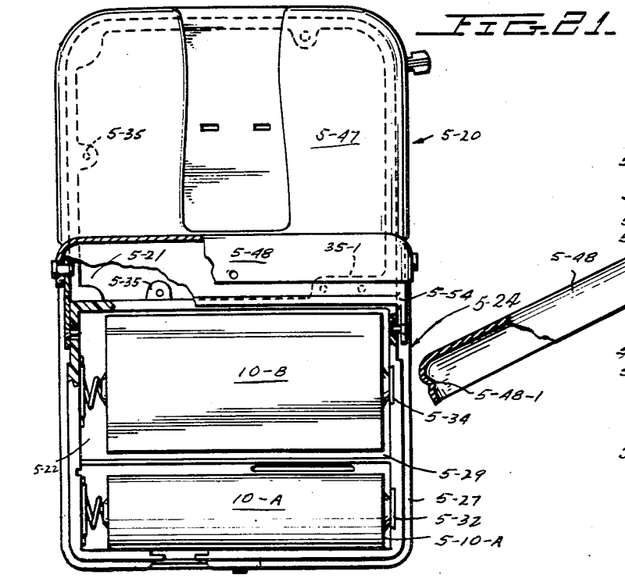
Figure 23:
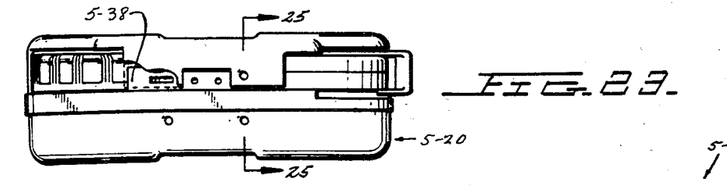
Figs. 23 and 24 are top and bottom views of the amplifier unit of Figs. 18, 21, 22.
Figure 24:
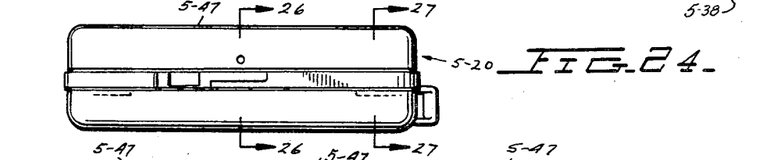

The two inwardly bent rim sections 5–52 of the rear wall 5–47 are provided with tongue-like arm extensions 5–54 having at their ends pivot pins 5–55 fitting pivot holes in the underlying border wall sides 5–25, 5–27 of the battery compartment so that the rear wall 5–47 may be tilted on its pivot pins 5–55 from the closed position shown in Fig. 19 to an outward position. Because of their elastic character the side tongue arms 5–54 of the rear wall 5–47 may be readily bent in outward direction so as to spring their pivot pins into the pivot holes of the underlying border wall section for pivotally retaining the rear wall 5–47 on the border wall structure 5–24 of the casing. The upper rim 5–51 of the rear wall 5–47 is provided with an inwardly extending detent 5–56 (Fig. 25) arranged to elastically snap into a recess provided in the underlying wall portion of the upper border wall section 5–38, for hingedly retaining the rear wall 5–47 in its closed position.

Figure 26:
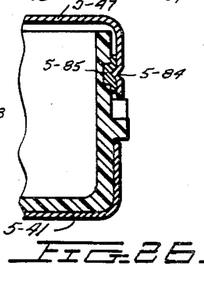
Figs. 26 and 27 are similar cross-sectional views along lines 26, 26 and 27, 27 of Fig. 24.

The hinged battery wall section 5–48 of the rear wall 5–47 is likewise provided with three inwardly extending rim sections arranged to interfit against the underlying wall portion and the raised shoulder 5–39 of the lower part of the border wall section 5–24 of the casing so that when the lower hinged wall section 5–48 is in its closed position, the rear wall 5–47 with its hinged battery wall section 5–48 will have their rear surfaces aligned substantially in a plane. The side rims of the hinged battery wall 5–48 are provided with tongue-like arm extensions 5–57 having pivot pins 5–58 engaging circular pivot holes in the underlying rim section of the rear wall 5–47 and permit pivotal movement of battery wall 5–48 from the open position of Fig. 22 to the closed position of Fig. 19 in which it forms a positive enclosure for the battery compartment 5–22. The hinged rear battery wall is held in its closed position by providing its lower border rim section with an inwardly extending detent 5–81 arranged to snap elastically into a locking recess formed in a metal insert 5–85 affixed in the underlying border wall section 26 (Fig. 26). The metallic recess insert 5–85 assures that it does not wear off by frequent opening and closing of hinged battery compartment wall 5–48.

With the casing wall arrangement described above, the rear wall 47 will normally remain affixed in its closed position to the border wall structure 5–24 and the user will not disturb it when opening and closing the hinged battery wall section 5–48 to replace batteries. However, the main rear wall 5–47 may be tilted away from its affixed position on the casing wall structure 5–24 by first unsnapping the detents 5–84 (Fig. 26) of its upper rim section 5–51. Thereupon the rear wall 5–47 may be tilted outwardly on its pivot pins 5–55 to expose the rear side of the amplifier chassis, with its response control switches.

The foregoing arrangement of the main rear wall 5–47 makes it also easy for the person fitting the instrument to release it from its affixed position on the casing border wall 5–24 by unsnapping the detents 5–56 (Fig. 25) of its upper rim section 5–51 and pivoting the rear wall 5–47 outwardly on its side pivot pins 5–58 whenever it is desired to adjust the setting of the response switches, and the power-level switch is for replacing any of the tubes.

Similarly, the front wall 5–41 will be retained in its affixed position on the border casing wall structure 5–24 and will not be released accidentally therefrom. When necessary, however, the front wall 5–41 may be removed by unsnapping the detents 5–82 of the upper rim section 5–43 of the front wall 5–41 (Fig. 25) from their interlocking connection with the underlying recesses of the casing border wall structure 5–38 whereupon the lower detents 5–81 (Fig. 27) of the front wall may be slipped out from the lower border wall recesses in which they are normally retained.

Figure 18:
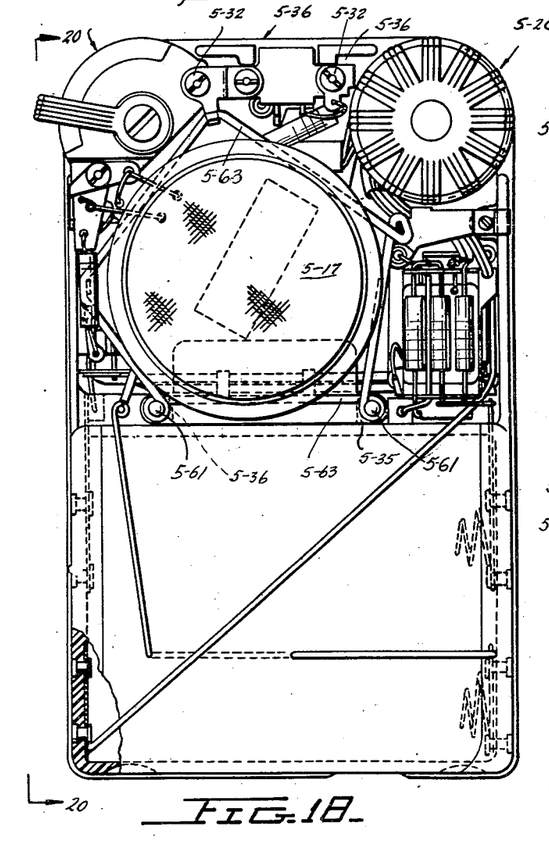
Fig. 18 is a front view of another form of a hearing aid amplifier unit exemplifying the invention, with the front casing wall removed and some parts broken away.

The shallow amplifier compartment 5–21 is kept small enough so as to be just sufficient to accommodate the flat microphone 5–17 and the superposed array of three amplifier tubes mounted behind it. The principal structural elements of the amplifier other than the microphone and the tubes are arrayed into a compact chassis structure formed of three chassis arms confined to the upper and side border region of the amplifier compartment 5–21 with the overall thickness required for accommodating the microphone 5–17 and the superposed array of tubes which occupy the space between the three arms of the amplifier chassis (Figs. 18, 19, 22).

It will be apparent to those skilled in the art that the novel principles of the invention disclosed herein in connection with specific exemplifications thereof will suggest various other modifications and applications of the same. It is accordingly desired that the present invention shall not be limited to the specific exemplifications shown or described therein.

I claim:

1. In a flat casing for a wearable hearing aid comprising an amplifier compartment for housing an amplifier having a plurality of replaceable components and a battery compartment for housing at least one replaceable battery, and also having upper and lower border wall portions and opposite side border wall portions bordering said compartments, a relatively extended movable casing wall of elastic sheet material comprising an amplifier wall section overlying the amplifier compartment and an adjoining relatively movable battery wall section overlying the battery compartment, said amplifier wall section and said battery wall section having each opposite side rim portions overlying opposite side border wall portions bordering said compartments, opposite side rim portions of one of said wall sections having elastic rim extensions overlying and pivotally connected to adjacent opposite side border wall portions of said casing, opposite side rim portions of the other wall section having elastic arm extensions overlapping and pivotally connected to adjoining opposite side rim portions of said one wall section.

2. In a flat casing for a wearable hearing aid comprising an amplifier compartment for housing an amplifier having a plurality of replaceable components and a battery compartment for housing at least one replaceable battery, and also having upper and lower border wall portions and opposite side border wall portions bordering said compartments, a relatively extended movable casing wall of elastic sheet material comprising an amplifier wall section overlying the amplifier compartment and an adjoining relatively movable battery wall section overlying the battery compartment, said amplifier wall section and said battery wall section having each opposite side rim portions overlying opposite side border wall portions bordering said compartments, opposite side rim portions of said amplifier wall sections having elastic rim extensions overlying and pivotally connected to adjacent opposite side border wall portions of said casing, opposite side rim portions of the battery wall section having elastic arm extensions overlapping and pivotally connected to adjoining opposite side rim portions of said one wall section.

3. In a flat casing for a wearable hearing aid as claimed in claim 2, the opposite rim extensions of the amplifier wall section having pivot pins engaging pivot holes of the adjacent opposite side border wall portions.

4. In a flat casing for a wearable hearing aid, as claimed in claim 3, the opposite side rim portions of each of the two wall sections forming parts of a substantially continuous rim extending along the three borders of each wall section.

5. In a wearable hearing aid, two facing walls of sheet metal confining between them a flat casing space comprising an amplifier compartment for housing amplifier components and a battery compartment for housing at least one replaceable battery element, one of said walls having two side rim portions bordering the opposite sides of said space and a transverse amplifier rim portion and a transverse battery rim portion bordering the opposite transverse sides of said amplifier and battery compartment spaces, the other wall comprising an amplifier wall section overlying said amplifier compartment and a battery wall section overlying said battery compartment, said amplifier wall section having two side battery rim portions bordering the opposite lateral sides of said amplifier compartment and a transverse amplifier rim portion bordering the transverse outer side of said amplifier compartment, said battery wall section having two side battery rim portions bordering the opposite sides of said battery compartment and a transverse battery rim portion bordering the transverse outer side of said battery compartment, two rim portions of said amplifier casing wall section and two adjacent rim portions of said one wall having interengaging locking portions holding them locked in their closed position.

6. In a wearable hearing aid as claimed in claim 5, amplifier rim portions of said one wall bordering the said amplifier compartment having at least one inwardly recessed sheet projection extending to fit under adjacent overlying rim portions of said amplifier wall section when they are in their closed position, said overlying rim portions having at least one locking projection arranged to engage in locking engagement said recessed sheet projection.

7. In a wearable hearing aid as claimed in claim 5, said recessed sheet projection having a locking opening portion interlockingly seated over said locking projections.

8. In a wearable hearing aid as claimed in claim 2, amplifier rim portions of said one wall bordering the said amplifier compartment having at least one inwardly recessed sheet projection extending to fit under adjacent overlying rim portions of said amplifier wall section when they are in their closed position, and overlying rim portions having at least one projection arranged to engage in locking engagement said recessed sheet projection.

9. In a wearable hearing aid as claimed in claim 8, said recessed sheet projection having a locking opening portion interlockingly seated over said locking projections.

10. In a wearable hearing aid as claimed in claim 2, the transverse amplifier rim portion of said one wall bordering the transverse outer side of said amplifier compartment having an inwardly recessed wall rim portion and arranged to fit under an adjacent overlying transverse rim portion of said amplifier wall section when they are in their closed position, said recessed rim portion having locking opening portions and the facing rim portion of said amplifier wall section having locking projection portions held interlocked in said locking opening portions when said one wall and said amplifier wall section are in their closed position, opposite side rim portions of said amplifier casing wall section having along an intermediate rim region of said casing space inwardly extending locking projections and the opposite intermediate rim region of said one wall having locking openings for receiving said locking projections and retaining said amplifier casing wall section locked in its closed position along said one wall.

11. In a wearable hearing aid as claimed in claim 2, an amplifier chassis having a frame structure arranged to be mounted along the three amplifier rim portions of said one wall, said frame structure having frame locking openings along at least two border regions thereof, said amplifier rim portions of said one wall having recessed locking projections interlockingly engaging said frame locking openings.

12. In a wearable hearing aid as claimed in claim 2, said battery wall section having side rim extensions pivotally connected to side rim regions of said amplifier wall section and being arranged to be pivoted between a closed position in which it encloses said battery compartment and an open position in which it exposes the interior of said battery compartment, the transverse rim portion of said battery wall section having an inwardly projecting wall detent portion, the adjacent transverse rim portion of said one wall having a recessed sheet projection with detent opening for engaging said wall detent and restraining said battery wall section in its closed position adjacent said one wall.

13. In a wearable hearing aid as claimed in claim 2, a battery positioning structure having a U-shaped frame structure of sheet material with an intermediate arm positioned along the transverse battery compartment rim of said one wall and two side positioning arms positioned along amplifier compartment side rims of said one wall, said side positioning arms including resilient biasing elements for holding in position a battery structure placed between them and for establishing detachable electrical terminal connections with opposite polarity terminals of said battery, said side positioning arms having detent opening portions and adjacent rim portions of said one wall having a recessed locking projection portion arranged to lockingly engage corresponding detent opening portions of adjacent positioning arms.

14. In a wearable hearing aid as claimed in claim 2, a battery positioning structure having a U-shaped frame structure of sheet material with an intermediate arm positioned along the transverse battery compartment rim of said one wall and two side positioning arms positioned along amplifier compartment side rims of said one wall, said side positioning arms including resilient biasing elements for holding in position a battery structure placed between them and for establishing detachable electrical terminal connections with opposite polarity terminals of said battery, end portions of each of said positioning arms adjoining the region of said amplifier compartment having detent portions, an amplifier chassis structure arranged to be interlocked with amplifier rim portions of said one wall and having detent portions engaging detent portions of said positioning arms for holding said positioning structure locked to said one wall when said chassis structure is held in its operative position in said one wall.

15. In a wearable hearing aid as claimed in claim 2, the opposite rim extensions of the amplifier wall section having pivot pins engaging pivot holes of the adjacent opposite side border wall portions, the opposite rim portions of each of the two wall sections forming parts of a substantially continuous rim extending along the three borders of each wall section, amplifier rim portions of said one wall bordering the said amplifier compartment having at least one inwardly recessed sheet projection extending to fit under adjacent overlying rim portions of said amplifier wall section when they are in their closed position, and overlying rim portions having at least one locking projection arranged to engage in locking engagement said recessed sheet projection.

16. In a wearable hearing aid as claimed in claim 15, said recessed sheet projection having a locking opening portion interlockingly seated over said locking projections.

17. In a wearable hearing aid as claimed in claim 2, the opposite rim extensions of the amplifier wall section having pivot pins engaging pivot holes of the adjacent opposite side border wall portions, the opposite side rim portions of each of the two wall sections forming parts of a substantially continuous rim extending along the three borders of each wall section, the transverse amplifier rim portion of said one wall bordering the transverse outer side of said amplifier compartment having an inwardly recessed wall rim portion and arranged to fit under an adjacent overlying transverse rim portion of said amplifier wall section when they are in their closed position, said recessed rim portion having locking opening portions and the facing rim portion of said amplifier wall section having locking projection portions held interlocked in said locking opening portions when said one wall and said amplifier wall section are in their closed position.

18. In a wearable hearing aid as claimed in claim 2, the opposite rim extensions of the amplifier wall section having pivot pins engaging pivot holes of the adjacent opposite side border wall portions, the opposite side rim portions of each of the two wall sections forming parts of a substantially continuous rim extending along the three borders of each wall section, an amplifier chassis having a frame structure arranged to be mounted along the three amplifier rim portions of said one wall, said frame structure having frame locking openings along at least two border regions thereof, said amplifier rim portions of said one wall having recessed locking projections interlockingly engaging said frame locking openings.

19. In a wearable hearing aid as claimed in claim 2, said battery wall section having side rim extensions pivotally connected to side rim regions of said amplifier wall section and being arranged to be pivoted between a closed position in which it encloses said battery compartment and an open position in which it exposes the interior of said battery compartment, the transverse rim portion of said battery wall section having an inwardly projecting wall detent portion, the adjacent transverse rim portion of said one wall having a recessed sheet projection with detent opening for engaging said wall detent and restraining said battery wall section in its closed position adjacent said one wall.

20. In a wearable hearing aid as claimed in claim 2, a battery positioning structure having a U-shaped frame structure of sheet material with an intermediate arm positioned along the transverse battery compartment rim of said one wall and two side positioning arms positioned along amplifier compartment side rims of said one wall, said side positioning arms including resilient biasing elements for holding in position a battery structure placed between them and for establishing detachable electrical terminal connections with opposite polarity terminals of said battery, said side positioning arms having detent opening portions and adjacent rim portions of said one wall having a recessed locking projection portion arranged to lockingly engage corresponding detent opening portions of adjacent positioning arms.

21. In a wearable hearing aid as claimed in claim 2, a battery positioning structure having a U-shaped frame structure of sheet material with an intermediate arm positioned along the transverse battery compartment rim of said one wall and two side positioning arms positioned along amplifier compartment side rims of said one wall, said side positioning arms including resilient biasing elements for holding in position a battery structure placed between them and for establishing detachable electrical terminal connections with opposite polarity terminals of said battery, end portions of each of said positioning arms adjoining the region of said amplifier compartment having detent portions, an amplifier chassis structure arranged to be interlocked with amplifier rim portions of said one wall and having detent portions engaging detent portions of said positioning arms for holding said positioning structure locked to said one wall when said chassis structure is held in its operative position in said one wall.

22. In a wearable hearing aid as claimed in claim 5, the transverse amplifier rim portion of said one wall bordering the transverse outer side of said amplifier compartment having an inwardly recessed wall rim portion and arranged to fit under an adjacent overlying transverse rim portion of said amplifier wall section when they are in their closed position, said recessed rim portion having locking opening portions and the facing rim portion of said amplifier wall section having locking projection portions held interlocked in said locking opening portions when said one wall and said amplifier wall section are in their closed position, opposite side rim portions of said amplifier casing wall section having along an intermediate rim region of said casing space inwardly extending locking projections and the opposite intermediate rim region of said one wall having locking openings for receiving said locking projections and retaining said amplifier casing wall section locked in its closed position along said one wall.

23. In a wearable hearing aid as claimed in claim 5, an amplifier chassis having a frame structure arranged to be mounted along the three amplifier rim portions of said one wall, said frame structure having frame locking openings along at least two border regions thereof, said amplifier rim portions of said one wall having recessed locking projections interlockingly engaging said frame locking openings.

24. In a wearable hearing aid as claimed in claim 5, said battery wall section having side rim extensions pivotally connected to side rim regions of said amplifier wall section and being arranged to be pivoted between a closed position in which it encloses said battery compartment and an open position in which it exposes the interior of said battery compartment, the transverse rim portion of said battery wall section having an inwardly projecting wall detent portion, the adjacent transverse rim portion of said one wall having a recessed sheet projection with detent opening for engaging said wall detent and restraining said battery wall section in its closed position adjacent said one wall.

25. In a wearable hearing aid as claimed in claim 5, a battery positioning structure having a U-shaped frame structure of sheet material with an intermediate arm positioned along the transverse battery compartment rim of said one wall and two side positioning arms positioned along amplifier compartment side rims of said one wall, said side positioning arms including resilient biasing elements for holding in position a battery structure placed between them and for establishing detachable electrical terminal connections with opposite polarity terminals of said battery, said side positioning arms having detent opening portions and adjacent rim portions of said one wall having a recessed locking projection portion arranged to lockingly engage corresponding detent opening portions of adjacent positioning arms.

26. In a wearable hearing aid as claimed in claim 5, a battery positioning structure having a U-shaped frame structure of sheet material with an intermediate arm positioned along the transverse battery compartment rim of said one wall and two side positioning arms positioned along amplifier compartment side rims of said one wall, said side positioning arms including resilient biasing elements for holding in position a battery structure placed between them and for establishing detachable electrical terminal connections with opposite polarity terminals of said battery, end portions of each of said positioning arms adjoining the region of said amplifier compartment having detent portions, an amplifier chassis structure arranged to be interlocked with amplifier rim portions of said one wall and having detent portions engaging detent portions of said positioning arms for holding said positioning structure locked to said one wall when said chassis structure is held in its operative position in said one wall.

27. In a wearable hearing aid as claimed in claim 5, said battery wall section having side rim extensions pivotally connected to side rim regions of said amplifier wall section and being arranged to be pivoted between a closed position in which it encloses said battery compartment and an open position in which it exposes the interior of said battery compartment, the transverse rim portion of said battery wall section having an inwardly projecting wall detent portion.

References Cited in the file of this patent
UNITED STATES PATENTS

| | | |
|---|---|---|
| 2,424,422 | Tresise et al. | July 22, 1947 |
| 2,496,683 | Tresise et al. | Feb. 7, 1950 |
| 2,500,301 | Tresise et al. | Mar. 14, 1950 |
| 2,564,425 | Corso et al. | Aug. 14, 1951 |
| 2,585,191 | Tresise et al. | Feb. 12, 1952 |
| 2,673,898 | Reichert | Mar. 30, 1954 |